(12) United States Patent
Ishizaka et al.

(10) Patent No.: US 7,913,315 B2
(45) Date of Patent: *Mar. 22, 2011

(54) RECORDING APPARATUS THAT RECORDS INFORMATION FOR PROTECTING INTANGIBLE PROPERTY RIGHT, RECORDING METHOD THEREOF, RECORD MEDIUM THEREOF, AND PROGRAM THEREOF

(75) Inventors: Toshihiro Ishizaka, Kanagawa (JP); Makoto Yamada, Tokyo (JP); Ryuji Ishiguro, Tokyo (JP)

(73) Assignee: Sony Corporation, Tokyo (JP)

( * ) Notice: Subject to any disclaimer, the term of this patent is extended or adjusted under 35 U.S.C. 154(b) by 918 days.

This patent is subject to a terminal disclaimer.

(21) Appl. No.: 11/732,768

(22) Filed: Apr. 4, 2007

(65) Prior Publication Data

US 2007/0180534 A1    Aug. 2, 2007

Related U.S. Application Data

(63) Continuation of application No. 10/297,520, filed as application No. PCT/JP02/03531 on Apr. 9, 2002, now abandoned.

(30) Foreign Application Priority Data

Apr. 9, 2001   (JP) .................................. 2001-110541

(51) Int. Cl.
*G06F 17/30* (2006.01)
(52) U.S. Cl. ............ 726/33; 726/26; 713/193; 713/188; 713/189

(58) Field of Classification Search .................. None
See application file for complete search history.

(56) References Cited

U.S. PATENT DOCUMENTS

| 5,761,417 | A | 6/1998 | Henley et al. | 709/231 |
|---|---|---|---|---|
| 5,805,821 | A | 9/1998 | Saxena et al. | 709/231 |
| 5,813,009 | A | 9/1998 | Johnson et al. | 707/100 |
| 5,813,017 | A | 9/1998 | Morris | 707/204 |
| 5,829,046 | A | 10/1998 | Tzelnic et al. | 711/162 |
| 5,966,730 | A | 10/1999 | Zulch | 711/162 |

(Continued)

FOREIGN PATENT DOCUMENTS

EP    1 045 387    10/2000

(Continued)

OTHER PUBLICATIONS

Japanese Abstracts, JP 2001-94549, published Apr. 6, 2001.

(Continued)

*Primary Examiner* — Pramila Parthasarathy
(74) *Attorney, Agent, or Firm* — Frommer Lawrence & Haug LLP; William S. Frommer; Paul A. Levy

(57) ABSTRACT

A recording apparatus according to the present invention comprises converting means 15, 18, and 19 and recording means 23, 24, 32, and 33. The converting means 15, 18, and 19 convert the data structure of data into a file structure handled by software. The recording means 23, 24, 32, and 33 record data on a record medium. The file structure has a first data unit as entity data, a second data unit as a set of a plurality of first data units, and a data portion describing management information for managing the relation of the plurality of first data units and attributes of entity data of the first data units. The data portion contains security information for protecting intangible property rights of data.

26 Claims, 15 Drawing Sheets

U.S. PATENT DOCUMENTS

| | | | | |
|---|---|---|---|---|
| 5,974,503 | A | 10/1999 | Venkatesh et al. | 711/114 |
| 6,032,154 | A | 2/2000 | Coleman et al. | 707/104.1 |
| 6,154,850 | A | 11/2000 | Idleman et al. | 714/5 |
| 6,226,759 | B1 | 5/2001 | Miller et al. | 714/6 |
| 6,456,985 | B1 | 9/2002 | Ohtsuka | |
| 6,651,074 | B1 | 11/2003 | Taylor | 707/204 |
| 6,738,904 | B2 * | 5/2004 | Linnartz et al. | 713/189 |
| 6,785,786 | B1 | 8/2004 | Gold et al. | 711/162 |
| 6,931,530 | B2 | 8/2005 | Pham et al. | 713/165 |
| 7,013,373 | B2 | 3/2006 | Mimatsu et al. | 711/162 |
| 2001/0053979 | A1 | 12/2001 | Kori | |
| 2002/0069363 | A1 | 6/2002 | Winburn | 713/200 |
| 2002/0107877 | A1 | 8/2002 | Whiting et al. | 707/204 |
| 2002/0118954 | A1 | 8/2002 | Barton et al. | 386/83 |

FOREIGN PATENT DOCUMENTS

| | | |
|---|---|---|
| JP | 10 108148 | 4/1998 |
| JP | 2000 69300 | 3/2000 |
| JP | 2001 101790 | 4/2001 |
| JP | 2002 510165 | 4/2002 |

OTHER PUBLICATIONS

Japanese Abstracts, JP H10-40649, published Feb. 13, 1998.
Japanese Abstracts, JP 2001-76425, published Mar. 23, 2001.
Japanese Abstracts, JP 2001-76464, published Mar. 23, 2001.
Japanese Abstracts, JP 2000-339207, published Dec. 8, 2000.
Japanese Abstracts, JP H09-46630, published Feb. 14, 1997.
Japanese Abstracts, JP H10-241288, published Sep. 11, 1998.
Japanese Abstracts, JP H09-245438, published Sep. 19, 1997.

* cited by examiner

Fig. 6

| RIGHTS MANAGEMENT DATA |
|---|
| ENCRYPTION KEY (CK) |
| C MAC |
| RMF |
| PPN |
| PLAYBACK COUNTER |
| START TIME/DATE |
| END TIME/DATE |
| CCF |
| PCN |
| COPY COUNTER |
| RESERVED AREA |

Fig. 10

| FLAG | | Attribute | EKB FIELD |
|---|---|---|---|
| 0x00 | NOT PRESENT | NOT VALID | NO DATA |
| 0x01 | PRESENT | VALID | EKB DATA |
| 0x02 | NOT PRESENT | VALID AS INDEPENDENT FILE | LINK INFORMATION (FILE ID, FILE NAME, etc.) |
| 0x03 | NOT PRESENT | VALID ON INTERNET | LINK INFORMATION (URL, etc.) |
| OTHERS | | RESERVED AREA | |

Fig. 12

| ENABLE KEY BLOCK | VERSION | ENCRYPTING ALGORITHM | E$_{kroot}$(KEK) | SIGNATURE PART | E$_{k0}$(Kroot) | E$_{k1}$(K0) | E$_{k2}$(K1) | --- | E$_{kn}$(Kn-1) | E$_{kleaf}$(Kn) |

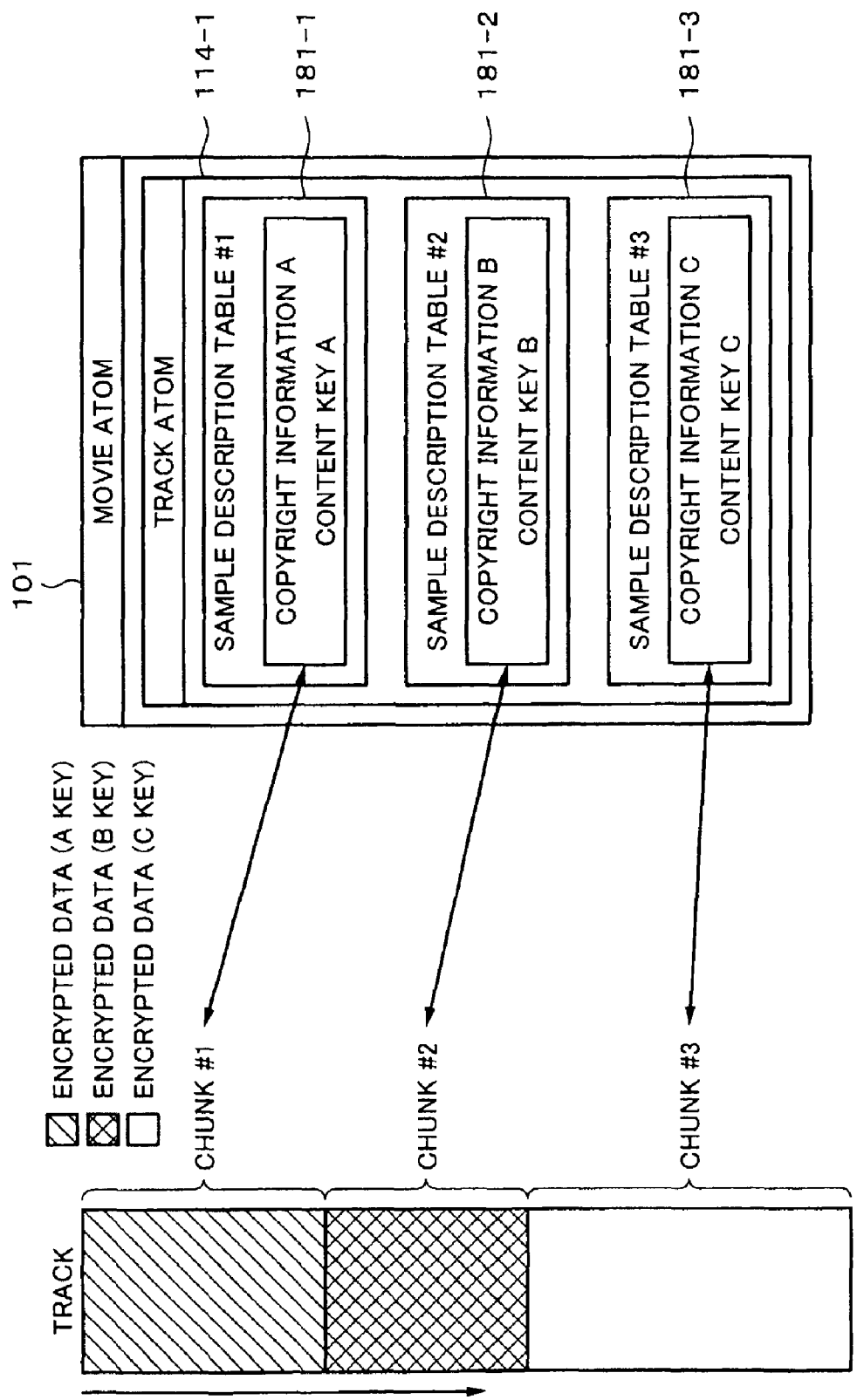

US 7,913,315 B2

RECORDING APPARATUS THAT RECORDS INFORMATION FOR PROTECTING INTANGIBLE PROPERTY RIGHT, RECORDING METHOD THEREOF, RECORD MEDIUM THEREOF, AND PROGRAM THEREOF

This is a continuation of application Ser. No. 10/297,520, filed Dec. 6, 2002 now abandoned, which is a 371 of PCT/JP02/03531 filed Apr. 9, 2002 with a claim of priority under 35 USC 119 to Japanese Application 2001-110541, filed in Japan on Apr. 9, 2001, the entirety thereof being incorporated herein by reference.

TECHNICAL FIELD

The present invention relates to a recording apparatus that records video data and audio data on a record medium, in particular, to a recording apparatus that has a function for protecting rights such as an intangible property right that have been entitled to data recorded on a record medium. In addition, the present invention relates to a recording method, a record medium, and a program for use with such a recoding apparatus.

BACKGROUND ART

Video data, audio data, or data of a computer program are recorded on record mediums at factory and distributed to consumers. Alternatively, they are downloaded to record mediums through a communication line and distributed to consumers.

Such record mediums are for example optical discs such as CD (Compact Discs) and DVDs (Digital Versatile Discs or Digital Video Discs), magneto-optical discs such as MDs, and memory cards.

However, when data is distributed to consumers, it is necessary to protect intangible property rights such as copyright and patent right that have been entitled thereto.

Therefore, an object of the present invention is to provide a recording apparatus that has a function for protecting intangible property rights that have been entitled to data.

In addition, another object of the present invention is to provide a recording method for protecting intangible property rights, a record medium on which data has been recorded so that the intangible property rights are protected, and a program that allows the intangible property rights to be protected.

DISCLOSURE OF THE INVENTION

The present invention is a recording apparatus that records data to a rewritable record medium, comprising a converting means for converting a data structure of the data into a file structure that can be handled by software, and a recording means for recording data that has been converted into the file structure to the record medium, wherein the file structure has a first data unit as entity data, a second data unit as a set of a plurality of first data units, and a data portion that describes management information for managing the relation of the plurality of first data units and attributes of entity data of the first data units, and wherein the data portion contains security information necessary for protecting an intangible property right entitled to the first data unit.

According to the present invention, in the recording apparatus, the security information may be contained in an independent file instead of the data portion. The data portion may contain designation information that designates the file.

According to the present invention, in the recording apparatus, to securely protect an intangible property right, it is preferred that the entity data is encrypted corresponding to a predetermined encrypting method and that the security information is a key necessary for decrypting the encrypted entity data. In addition, it is preferred that the key is encrypted corresponding to a predetermined encrypting method and that the data portion further contains a key necessary for decrypting the encrypted key.

According to the present invention, in the recording apparatus, to securely protect an intangible property right, it is preferred that the data portion further contains falsification identification information for identifying whether or not the security information has been falsified.

According to the present invention, in the recording apparatus, to securely protect an intangible property right, it is preferred that the security information contains at least one of a start time at which the use of the entity data is started and an end time at which the use of the entity data is stopped. In addition, it is preferred that the security information is number-of-times restriction information for restricting the number of times of which the entity data can be reproduced. Moreover, it is preferred that the security information is copy restriction information for restricting the number of times of which the entity data can be copied. Moreover, it is preferred that the security information is copy identification information for identifying whether the entity data is original entity data or copied entity data.

Thus, according to the present invention, since security information for protecting intangible property rights and entity data are correlatively recorded, the entity data can be securely protected from infringements. In addition, since security information is added to each first data unit, individual entity data rather than each record medium can be securely protected from infringements. Thus, various services can be provided for each first data unit.

BRIEF DESCRIPTION OF DRAWINGS

FIG. 6 is a schematic diagram showing the structure of right management data;

FIG. 10 is a schematic diagram showing the definition of a flag of an enable key block unit;

FIG. 12 is a schematic diagram showing the data structure of an enable key block;

FIG. 15 is a schematic diagram for explaining a third relation between a rights protecting method and a provided service.

BEST MODES FOR CARRYING OUT THE INVENTION

Figure 1:
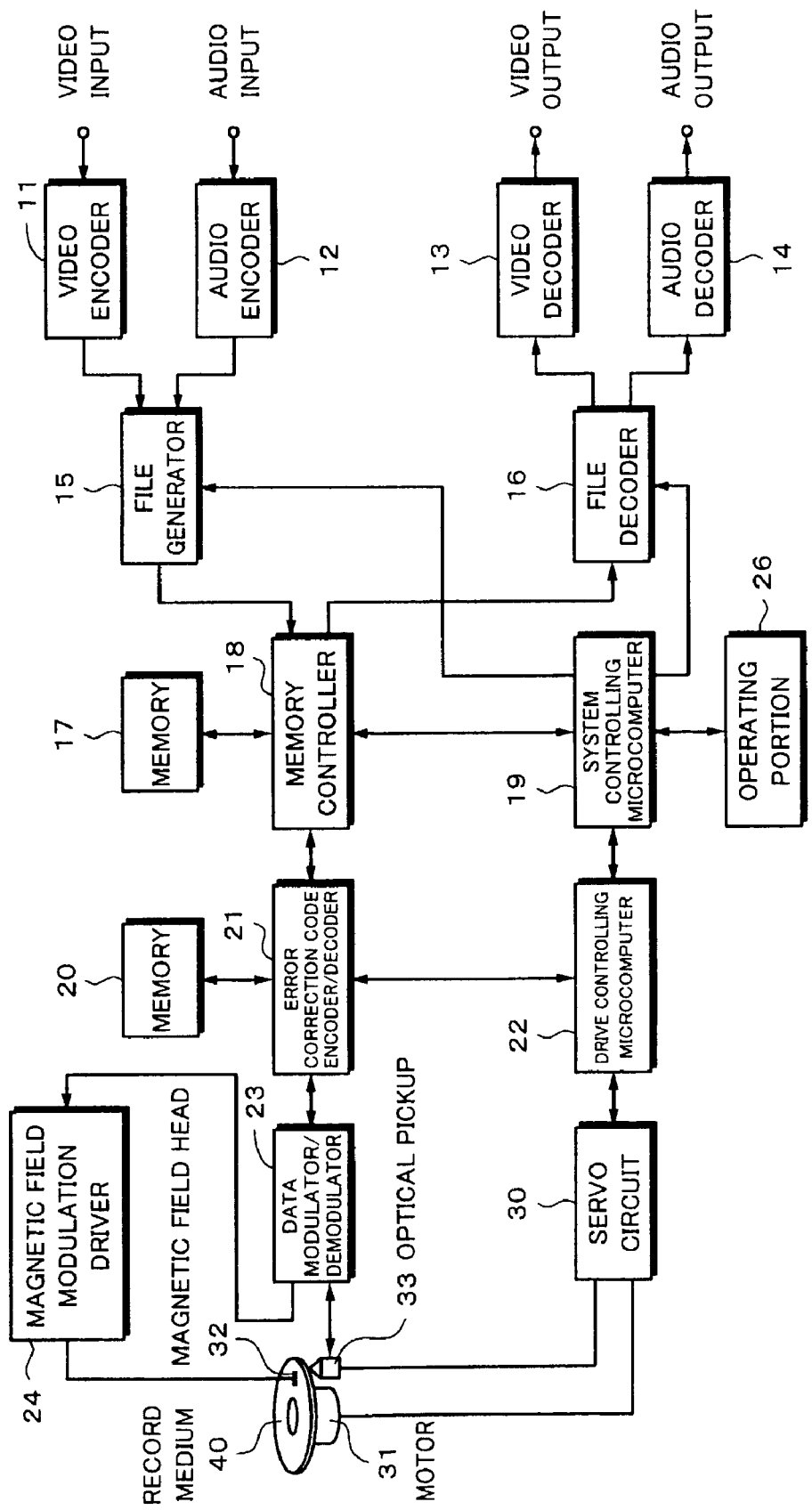
FIG. 1 is a block diagram showing an example of the structure of a digital recording and reproducing apparatus.

Next, with reference to the accompanying drawings, an embodiment of the present invention will be described. In the following drawings, similar reference numerals represent similar structures.

FIG. 1 is a block diagram showing an example of the structure of a digital recording and reproducing apparatus.

In FIG. 1, the digital recording and reproducing apparatus comprises a video encoder 11, an audio encoder 12, a video decoder 13, an audio decoder 14, a file generator 15, a file decoder 16, memories 17 and 20, a memory controller 18, a system controlling microcomputer 19, an error correction code encoder/decoder 21, a drive controlling microcomputer 22, a data modulator/demodulator 23, a magnetic field modulation driver 24, an operating portion 26, a servo circuit 30, a motor 31, a magnetic field head 32, and an optical pickup 33.

A video signal is input from a vide input terminal. The video signal is supplied to the video encoder 11. The video encoder 11 compresses and encodes the video signal. An audio signal is input from an audio input terminal. The audio signal is supplied to the audio encoder 12. The audio encoder 12 compresses and encodes the audio signal. Output signals of the video encoder 11 and the audio encoder 12 are called elementary streams.

According to the embodiment, it is assumed that the digital recording and reproducing apparatus is an apparatus integrated with a camera. The video signal is supplied as a picture photographed by the video camera. An optical system supplies, photographed light of an object to a photographing device such as CCD (Charge Coupled Device) and generates a video signal. As the audio signal, a sound collected by a microphone is supplied.

When the compressing and encoding process corresponds to the MPEG system, the video encoder 11 comprises an analog/digital converter (hereinafter abbreviated as A/D converter), a format converting portion, a screen re arranging portion, a subtracting portion, a DCT portion, a quantizing portion, a variable length code encoding portion, a buffer memory, a rate controlling portion, an inversely quantizing portion, an inverse DCT portion, an adding portion, a frame memory, a motion compensating and predicting portion, and a switch as electronic circuits.

A video signal is supplied to the video encoder 11. The A/D converter digitizes the video signal. The format converting portion converts the digitized signal into a spatial resolution used in the encoding process. The spatial resolution is supplied to the screen re-arranging portion. The screen re-arranging portion re-arranges the sequence of pictures so that they can be properly processed in the encoding process. An output signal of the screen re-arranging portion is input to the DCT portion through the subtracting portion. The DCT portion performs a DCT encoding process for the signal supplied from the screen re-arranging portion. An output signal of the DCT portion is input to the quantizing portion. The quantizing portion quantizes the output signal of the DCT portion with a predetermined number of bits. An output signal of the quantizing portion is input to the variable length code encoding portion and the inversely quantizing portion. The variable length code encoding portion encodes the output signal of the quantizing portion with a variable length code such as Huffman code. The encoded data is output to the buffer memory. The buffer memory outputs the encoded data as output data of the video encoder at a predetermined rate. Since the code amount generated by the variable length code encoding portion is variable, the rate controlling portion monitors the buffer memory and controls the quantizing operation of the quantizing portion so that a predetermined bit rate is kept.

On the other hand, since I pictures and P pictures are used as reference screens by the motion compensating and predicting portion, a signal that is input from the quantizing portion to the inversely quantizing portion is inversely quantized and then input to the inverse DCT, portion. The inverse DCT portion performs the inverse DCT process for the inversely quantized signal. An output signal of the inverse DCT portion and an output signal of the motion compensating and predicting portion are added by the adding portion. The added signal is input to the frame memory. An output signal of the frame memory is input to the motion compensating and predicting portion. The motion compensating and predicting portion performs a forward prediction, a backward prediction, and a bi-directional prediction for the output signal of the frame memory. An output signal of the motion compensating and predicting portion is output to the adding portion and the subtracting portion. The inversely quantizing portion, the inverse DCT portion, the adding portion, the frame memory, and the motion compensating and predicting portion compose a local decoding portion that outputs the same decoded video signal as the video decoder.

The subtracting portion subtracts the output signal of the screen re-arranging portion from the output signal of the motion compensating and predicting portion and obtains a predictive error between the video signal and the decoded video signal decoded by the local decoding portion. When the intra-frame encoding process is performed (namely, I pictures are supplied), the switch causes the subtracting device not to perform a subtracting process for them. In other words, the I pictures are supplied to the DCT portion.

Returning to FIG. 1, when for example MPEG/Audio layer 1/layer 2 is used, the audio encoder 12 further comprises a sub band encoding portion and an adaptive quantizing bit assigning portion as electronic circuits. The audio signal is divided into 32 sub band signals by the sub band encoding portion. The 32 sub band signals are quantized corresponding to psychological hearing sense weighting by the adaptive quantizing bit assigning portion. The quantized signal is output as a bit stream. To improve the encoding quality, MPEG/Audio layer 3 may be used.

An output signal of the video encoder 11 and an output signal of the audio encoder 12 are supplied to the file generator 15. The file generator 15 converts the video elementary stream and the audio elementary stream into file structures that a computer software program that synchronously reproduces a moving picture, sound, and text can handle without need to use a particular hardware structure. Such a computer software program is for example QuickTime (a typical example of cross platform multimedia formats provided by Apple Computer Inc (USA). Hereinafter, QuickTime is abbreviated as QT. Next, the case that QT is used will be described. After encrypting the encoded video data and the encoded audio data with an encryption key, the file generator 15 multiplexes the encrypted video data and the encrypted audio data under the control of the system controlling microcomputer 19.

Since the encrypting unit is a predetermined unit length, according to the embodiment of the present invention, it is preferred to use block encrypting system as an encrypting algorithm. For example, as will be described later, DES, FEAL, MISTY, MULTI, IDEA, RC5, or the like is used.

A QuickTime movie file that is output from the file generator 15 is successively written to the memory 17 through the memory controller 18. When the system controlling microcomputer 19 requests the memory controller 18 to write data to a record medium 40, the memory controller 18 reads a QuickTime movie file from the memory 17. In addition, the system controlling microcomputer 19 stores various data that take place during the execution of the program to the memory 17 through the memory controller 18.

In this case, the transfer rate of an encoded QuickTime movie is designated so that it is lower than (for example, ½ of) the transfer rate of data written to the record medium 40. Thus, although a QuickTime movie file is successively written to the memory 17, a QuickTime movie file is intermittently read from the memory 17 under the control of the system controlling microcomputer 19 so that the memory 17 does not overflow or underflow.

The QuickTime movie file that is read from the memory 17 is supplied from the memory controller 18 to the error correction code encoder/decoder 21. The error correction code encoder/decoder 21 temporarily writes the QuickTime movie file to the memory 20 so as to generate redundant data of interleaved data and an error correction code. The error correction code encoder/decoder 21 reads the redundant data from the memory 20 and supplies the redundant data to the data modulator/demodulator 23.

When digital data is recorded to the record medium 40, the data modulator/demodulator 23 modulates the data so that a clock can be easily extracted from the reproduced signal and no inter-code interference takes place. For example (1, 7) RLL (run length limited) code, Trellis code, and so forth can be used.

An output signal of the data modulator/demodulator 23 is supplied to the magnetic field modulation driver 24 and the optical pickup 33. The magnetic field modulation driver 24 drives the magnetic field head 32 corresponding to the input signal so as to apply a magnetic field to the record medium 40. The optical pickup 33 radiates a recording laser beam corresponding to the input, signal to the record medium 40. In such a manner, data is recorded to the record medium 40.

The record medium 40 is a rewritable optical disc (for example, MO: magneto-optical disc), or a phase change type disc.

According to the embodiment, an MO, for example, a relatively small disc whose diameter is around 4 cm, 5 cm, 6.5 cm, or 8 cm, is used. The record medium 40 is rotated at constant linear velocity (CLV), constant angular velocity (CAV), or zone CLV (ZCLV) by the motor 31.

The drive controlling microcomputer 22 outputs a signal to the servo circuit 30 corresponding to a request from the system controlling microcomputer 19. The servo circuit 30 controls the motor 31 and the optical pickup 33 corresponding to the output signal of the drive controlling microcomputer 22. As a result, the drive controlling microcomputer 22 controls the entire drive. For example, the servo circuit 30 performs a radius traveling servo operation, a tracking servo operation, and a focus servo operation for the record medium 40 and controls the rotations of the motor 31.

The operating portion 26 is connected to the system controlling microcomputer 19. The user can input a predetermined command to the operating portion 26.

In the reproduction mode, the optical pickup 33 radiates a laser beam having a reproduction output level to the record medium 40. The optical detector of the optical pickup 33 receives the reflected light as a reproduction signal. In this case, the drive controlling microcomputer 22 detects a tracking error and a focus error from an output signal of the optical detector of the optical pickup 33. The servo circuit 30 controls the optical pickup 33 so that the reading laser beam focuses on a predetermined track. In addition, the drive controlling microcomputer 22 controls the traveling in the radius direction of the optical pickup so as to reproduce data at a desired position on the record medium 40. Like the record mode, the desired position is determined by the system controlling microcomputer 19 in such a manner that it supplies a predetermined signal to the drive controlling microcomputer 22.

A signal reproduced by the optical pickup 33 is supplied to the data modulator/demodulator 23. The data modulator/demodulator 23 demodulates the reproduced signal. The demodulated data is supplied to the error correction code encoder/decoder 21. The reproduced data is temporarily stored in the memory 20. The error correction code encoder/decoder 21 performs a de-interleaving process and an error correcting process for the demodulated data. The QuickTime movie file that has been error corrected is stored to the memory 17 through the memory controller 18.

The QuickTime movie file stored in the memory 17 is output to the file decoder 16 corresponding to a request from the system controlling microcomputer 19. The system controlling microcomputer 19 monitors the data amount of the reproduction signal reproduced from the record medium 40 and stored in the memory 17 and the data amount of the data that is read from the memory 17 and supplied to the file decoder 16 and controls the memory controller 18 and the drive controlling microcomputer 22 so that the memory 17 does not overflow or underflow. In such a manner, the system controlling microcomputer 19 intermittently reads data from the record medium 40.

The file decoder 16 separates the QuickTime movie file into a video elementary stream and an audio elementary file under the control of the system controlling microcomputer 19. The file decoder 16 decodes data corresponding to security information and encryption key (that will be described later) under the control of the system controlling microcomputer 19. When the security information prohibits data from being used or when the encryption key is not proper, the data is not decoded. The decoded video elementary stream is supplied to the video decoder 13. The video decoder 13 decodes the video elementary stream that has been compressed and encoded. The decoded video data is output from a video output terminal. The audio elementary stream is supplied to the audio decoder 14. The audio decoder 14 decodes the audio elementary stream that has been compressed and encoded. The decoded audio data is output from an audio output terminal. The file decoder 16 synchronously outputs the video elementary stream and the audio elementary stream.

When the video decoder 13 corresponds to the MPEG system, the video decoder 13 comprises a buffer memory, a variable length code decoding portion, an inversely quantizing portion, an inverse DCT portion, an adding portion, a frame memory, a motion compensating and predicting portion, a screen re-arranging portion, and a digital/analog converter (hereinafter abbreviated as "D/A") as electronic circuits. A video elementary stream is temporarily stored in the buffer memory. Thereafter, the video elementary stream is input to the variable length code decoding portion. The variable length code decoding portion decodes macro block encoded information and separates it into a predicting mode, a moving vector, quantized information, and quantized DCT coefficients. The inversely quantizing portion 73 de-quantizes the quantized DCT coefficients into DCT coefficients. The inverse DCT portion coverts the DCT coefficients into pixel spatial data. The adding portion adds an output signal of the inverse DCT portion and an output signal of the motion compensating and predicting portion. However, when an I picture is decoded the adding portion does not add these output signals. All macro blocks of the screen are decoded. The screen re-arranging portion re-arranges the decoded macro blocks in the original input sequence. The D/A converts the rearranged data into an analog signal. Since an I picture and a P picture are used as reference screens in the decoding process that follows, they are stored in the frame memory. The I picture and the P picture are output to the motion compensating and predicting portion.

When MPEG/Audio layer 1/layer 2 is used, the audio decoder 14 comprises a bit stream disassembling portion, an inversely quantizing portion, and a sub band combining filter bank portion as electronic circuits. An input audio elementary stream is supplied to the bit stream disassembling portion. The bit stream disassembling portion separates the input audio elementary stream into a header, auxiliary information, and a quantized sub band signal. The inversely quantizing portion inversely quantizes the quantized sub band signal with a predetermined number of bits that has been assigned. The sub-band combining band filter combines the inversely quantized data and outputs the combined data.

When the digital recording and reproducing apparatus records data such as video data, audio data, text data, and a computer program to which intangible property rights (such as copyright and patent right) to the record medium 40, the apparatus also records data for protecting the intangible property rights (hereinafter, this data is referred to as "security data") to the record medium 40. In addition, the security data is generated in the same file format as data to be protected such as video data so that the digital recording and reproducing apparatus can handle them in the same manner. According to the embodiment of the present invention, the data to be protected and the security data are generated in the format of for example a QuickTime movie file. Thus, the recording and reproducing apparatus can reproduce all of them on QT.

QT is a software program that manages various types of data along the time base and that has an OS extension function for synchronously reproducing a moving picture, a sound, a text, and so forth without need to use a special hardware device. QT has been disclosed in for example "Inside Macintosh QuickTime (Japanese Edition)", Addison Wesley. Next, QT will be described corresponding to the document.

A basic data unit of a QT movie resource is called an atom. Each atom contains a size and type information along with data. In QT, the minimum unit of data is treated as a sample. As a set of samples, a chunk is defined.

Figure 2:
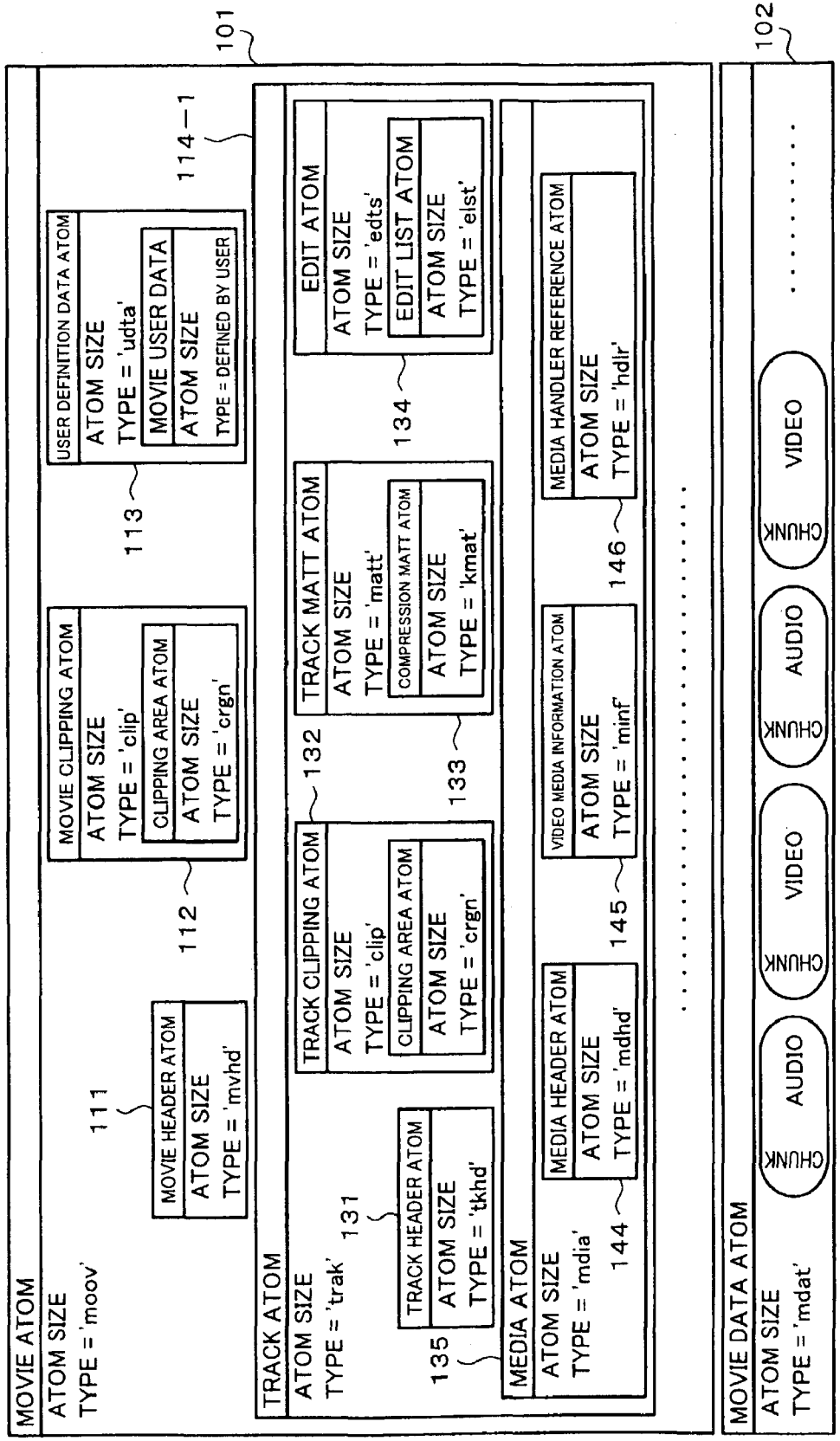
FIG. 2 is a schematic diagram showing an example of the structure of a QuickTime movie file.

FIG. 2 is a schematic diagram showing an example of the structure of a QuickTime movie file.

Figure 3:
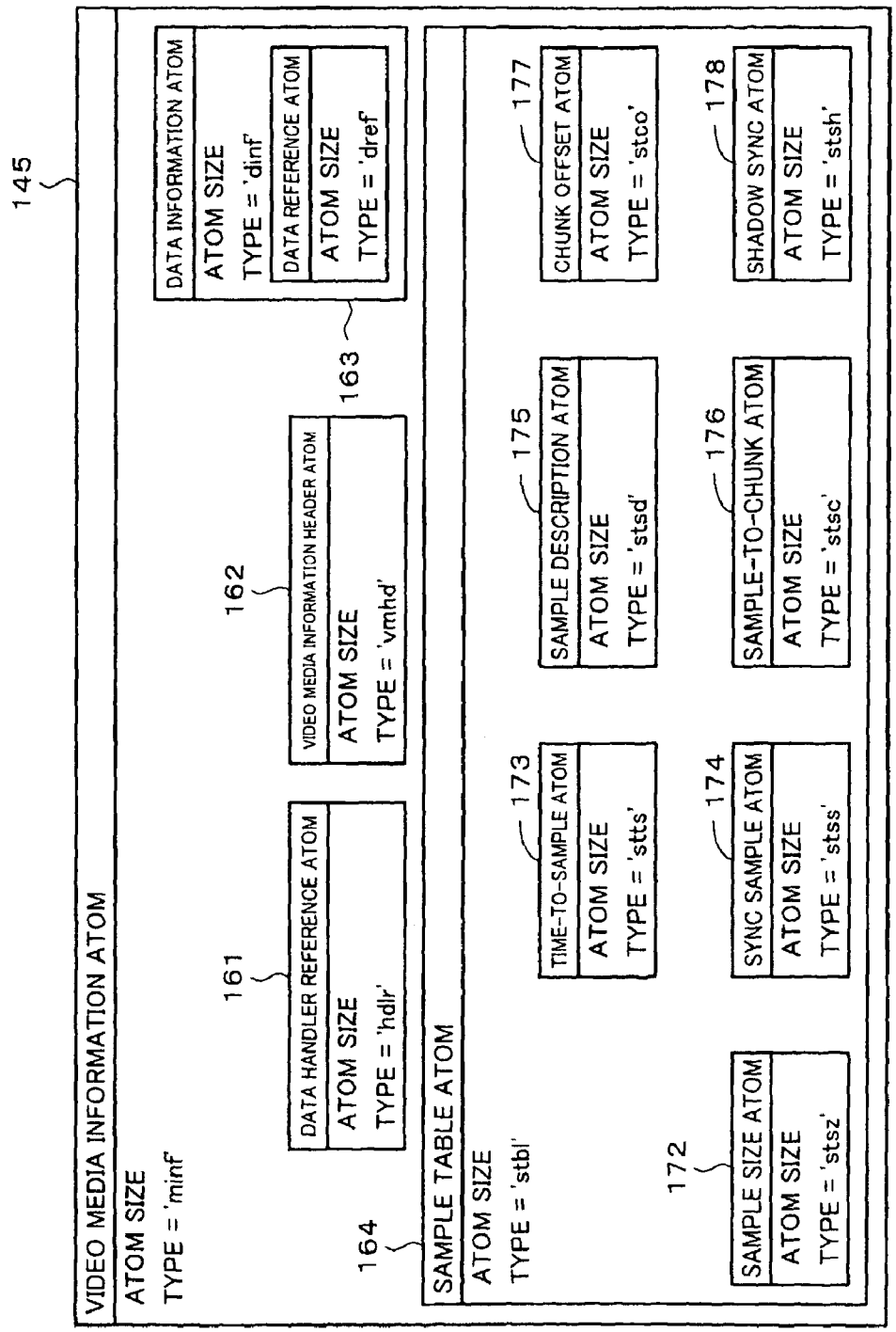
FIG. 3 is a schematic diagram showing an example of the structure of a video media information atom.

FIG. 3 is a schematic diagram showing an example of the structure of a video media information atom. FIG. 3 is a detailed schematic diagram showing the video media information atom shown in FIG. 2 in the case that tracks are video information.

In FIGS. 2 and 3, a QuickTime movie file is mainly composed of two portions that are a movie atom 101 and a movie data atom 102. The movie atom 101 is a portion that contains information necessary for reproducing a file and information necessary for referencing entity data. The movie data atom 102 is a portion that contains entity data such as video data, audio data, a computer program, and text data.

The movie atom 101 contains a movie header atom 111, a movie clipping atom 112, a user definition data atom 113, at least one track atom 114, and so forth. The movie header atom 111 contains information with respect to the entire movie. The movie clipping atom 112 designates a clipping area.

The track atom 114 is provided for each track of a movie. The track atom 114 contains a track header atom 131, a track clipping atom 132, a track matte atom 133, an edit atom 134, and a media atom 135. The track atom 114 describes information with respect to individual pieces of data of the movie data atom 102 in the atoms 131 to 135. FIG. 2 shows only a track atom 114-1 of a video movie (omitting other track atoms).

The media atom 135 contains a media header atom 144, a media information atom (video media information atom 145 in FIGS. 2 and 3), and a media handler reference atom 146. The media atom 135 describes information that defines components for interpreting data of a movie track and media data in the media header atom 144, the media information atom, and the media handler reference atom 146.

The media handler maps a media time to media data using the information of the media information atom.

The media information atom 145 contains a data handler reference atom 161, a media information header atom 162, a data information atom 163, and a sample table atom 164.

The media information header atom (a video media information header atom 162 in FIG. 3) describes information with respect to media. The data handler reference atom 161 describes information with respect to handling of media data. The data handler reference atom 161 contains information that designates a data handler component that provides an access means for media data. The data information atom 163 contains a data reference atom. The data reference atom describes information with respect to data.

The sample table atom 164 contains information necessary for converting a media time into a sample number that represents a sample position. The sample table atom 164 is composed of a sample size atom 172, a time-to-sample atom 173, a sync sample atom 174, a sample description atom 175, a sample-to-chunk atom 176, a chunk offset atom 177, and a shadow sync atom 178.

The sample size atom 172 describes the size of a sample. The time-to-sample atom 173 describes the relation between samples and time base (how many seconds and minutes of data have been recorded). The sync sample atom 174 describes information with respect to synchronization and designates a key frame of media. A key frame is a self included frame that does not depend on the preceding frame. The sample description atom 175 contains information necessary for decoding a sample of media. Media can have at least one sample description atom corresponding to a compression type used in media. The sample-to-chunk atom 176 references a table contained in the sample description atom 175 and identifies a sample description corresponding to each sample of media. The sample-to-chunk atom 176 describes the relation between samples and chunks. The sample-to-chunk atom 176 identifies the position of a sample of media corresponding to information of the first chunk, the number of samples per chunk, and a sample description ID. The chunk offset atom 177 describes the start bit position of a chunk of movie data and defines the position of each chunk of a data stream.

In FIG. 2, the movie data atom 102 contains audio data encoded corresponding to a predetermined compressing and encoding system and video data that has been encoded corresponding to a predetermined compressing and encoding system in the unit of a chunk composed of a predetermined number of samples. It is not always necessary to compress and encode data. Instead, linear data can be contained. For example, when text, MIDI (Musical Instrument Digital Interface), or the like is handled, the movie data atom 102 contains entity data of text, MIDI, or the like. Correspondingly, the movie atom 101 contains a text track, a MIDI track, or the like.

Each track atom 114 of the movie atom 101 is correlated with data (data stream) contained in the movie data atom 102. With such a featured structure, synchronous reproducing operation can be scheduled and editing (non-destructive editing) operation can be performed without need to change data entity. In, addition, a track can be easily added and deleted.

With such a hierarchical structure, when data contained in the movie data atom 102 is reproduced, QT successively traces the hierarchical structure from the movie atom 101, maps a sample table to memory corresponding to the atoms 172 to 178 contained in the sample table atom 164, and identifies an interpreting method, attributes, and so forth of each data piece, and the relation among individual data pieces (positions and sizes of data pieces). QT reproduces data corresponding to the relation among data pieces.

According to the embodiment of the present invention, while excellent features of QT are used, a function and a format necessary for handling data to be protected are extended. As a result, intangible property rights entitled to data are protected. Next, only copyright contained in intangible property rights will be described. However, it should be noted that the present invention can be applied to the other intangible property rights. By correlating a sample as the minimum access unit of QT with the minimum decryption unit (data block) of encrypted entity data, synchronous reproducing operation and editing operation can be performed using the managing capability on the time base of QT. In a combination with a key management, by more definitely assigning rights and designating use conditions thereof, the same content can be used in new manners.

In more reality, according to the present invention, a sample description table of each track atom has an extended format that contains security data so that key information for decrypting encrypted data and security information such as use conditions of a content are secured as independent data streams. As a result, QT can handle a multimedia content to which intangible property rights have been entitled.

Figure 4:
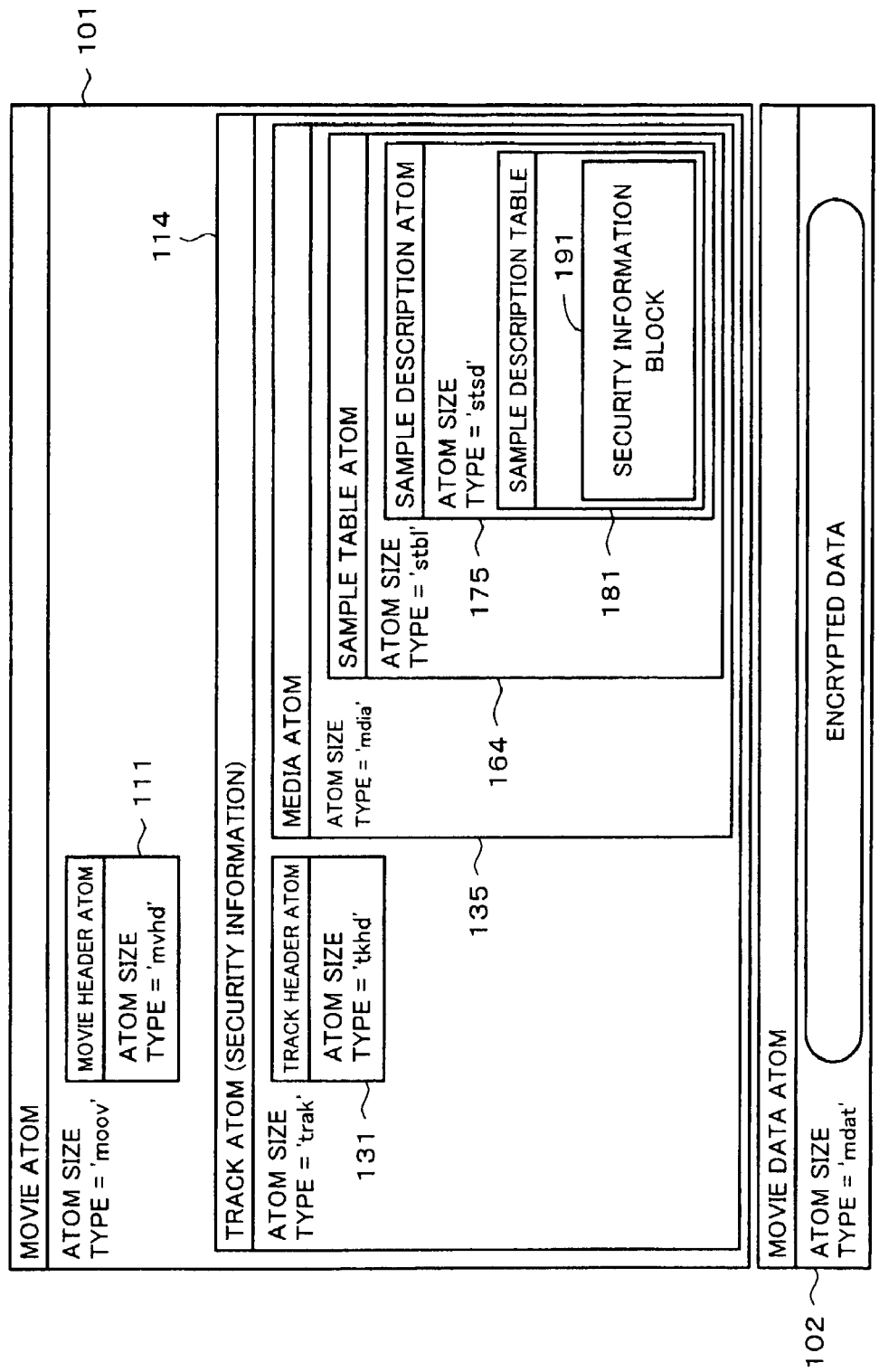
FIG. 4 is a schematic diagram showing the structure of a QuickTime movie file according to an embodiment of the present invention.

FIG. 4 is a schematic diagram showing the structure of a QuickTime movie file according to the embodiment of the present invention.

Figure 5:
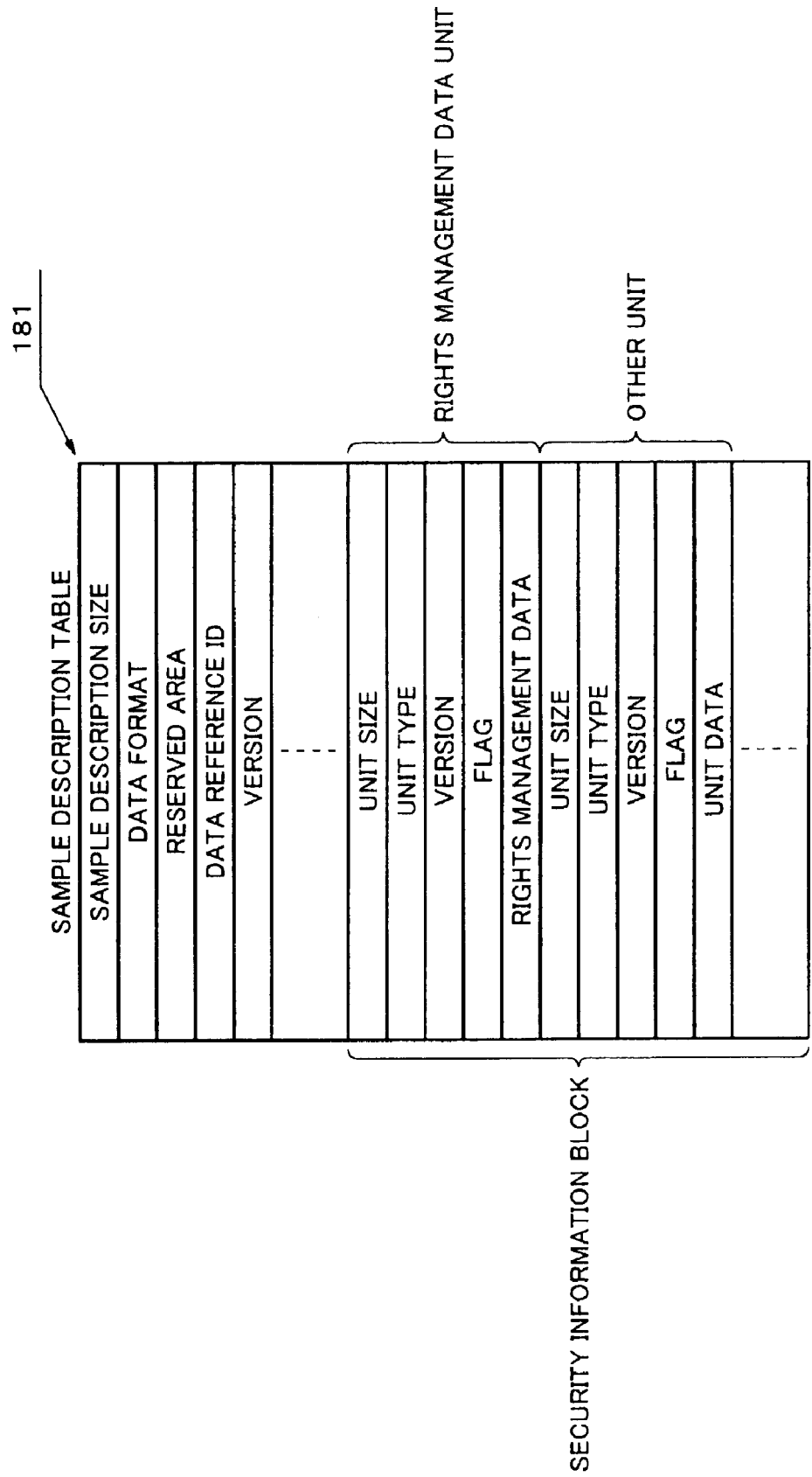
FIG. 5 is a schematic diagram, showing the structure of a sample description table according to the embodiment of the present invention.

FIG. 5 is a schematic diagram showing the structure of a sample distribution table according to the embodiment of the present invention.

As shown in FIG. 4, a security information block 191 is extension fields preceded by standard QT fields. The security information block 191 is placed in a sample description table of each track. As shown in FIG. 5, the security information block 191 is composed of only a rights management data (hereinafter abbreviated as "RMD") unit. Alternatively, the security information block 191 is composed of a plurality of units that are an RMD unit and other units. These units can be placed in any order.

A unit size field is contained in each unit. The unit size field represents the number of bytes of the unit. A unit type field is a tag that designates the type of the unit. When the current unit is an RMD unit, the unit type field is right.

A version field represents a version number of the unit. A flag field has been reserved for a flag of the unit.

The flag field is followed by data entity (unit data) of the unit. When the unit is an RMD unit, the data entity is a collection of information with respect to security and encryption key.

When required by a security system, a file format, and so forth that are newly used, corresponding to the extension fields, the tag of the data format field that designates the data type in the standard QT fields can be defined.

A standard QT is QT whose sample description table does not contain extension fields for protecting rights according to the present invention.

FIG. 6 is a schematic diagram showing the structure of rights management data.

In FIG. 6, an RMD unit contains a collection of information with respect to copyright protection as use conditions such as content encryption key (hereinafter abbreviated as "CK"), C_MAC, RMF, PPN, playback counter, start time/date, end time/date, CCF, PCN, copy counter, and reserved area.

The CK field contains a content encryption key that has been used to encrypt a data stream of the track (in reality, each track is divided into data blocks).

The C_MAC field contains a falsification protection code for the RMD. The falsification protection code is a calculated value that is uniquely and irreversibly generated from all field values of the RMD corresponding to for example ISO/IEC 9797 MAC (Message Authentication Code) calculating method.

An RMF (Rights Management Flag) field is a flag that represents the presence or absence of a restriction and the type thereof.

The PPN (number of permitted playback) field represents the maximum number of times of which the playback operation can be performed.

The playback counter field represents a counter value of the number of times of which the playback operation has been performed. Whenever the playback operation is performed, the counter value is decremented. The initial value of the playback counter field is the same as the initial value of the PPN field.

The start time/date field represents the start time/date when the RMF field represents the presence of a restriction.

The end time/date field represents the end time/date when the RMF field represents the presence of a restriction.

The CCF (Copy Control Flag) field is a copy control flag. The CCF field designates attributes of copy permitted/prohibited, copy permissible generation, and original data/copied data.

The PCN field represents the maximum value of the number of times of which a content can be transferred/copied to a medium such as an LCM (Licensed Compliant Module).

The copy counter field represents a counter value that is decremented whenever a content is transferred/copied. The initial value of the copy counter field is the same as the initial value of the PCN field.

The RMF, PPN playback counter, start time/date, end time/date, CCF, PCN, and copy counter designate use conditions of the content.

Next, with reference to FIGS. 7 and 8, the structure of a movie data atom and a correlation of entity data; and a media atom will be described.

Figure 7:
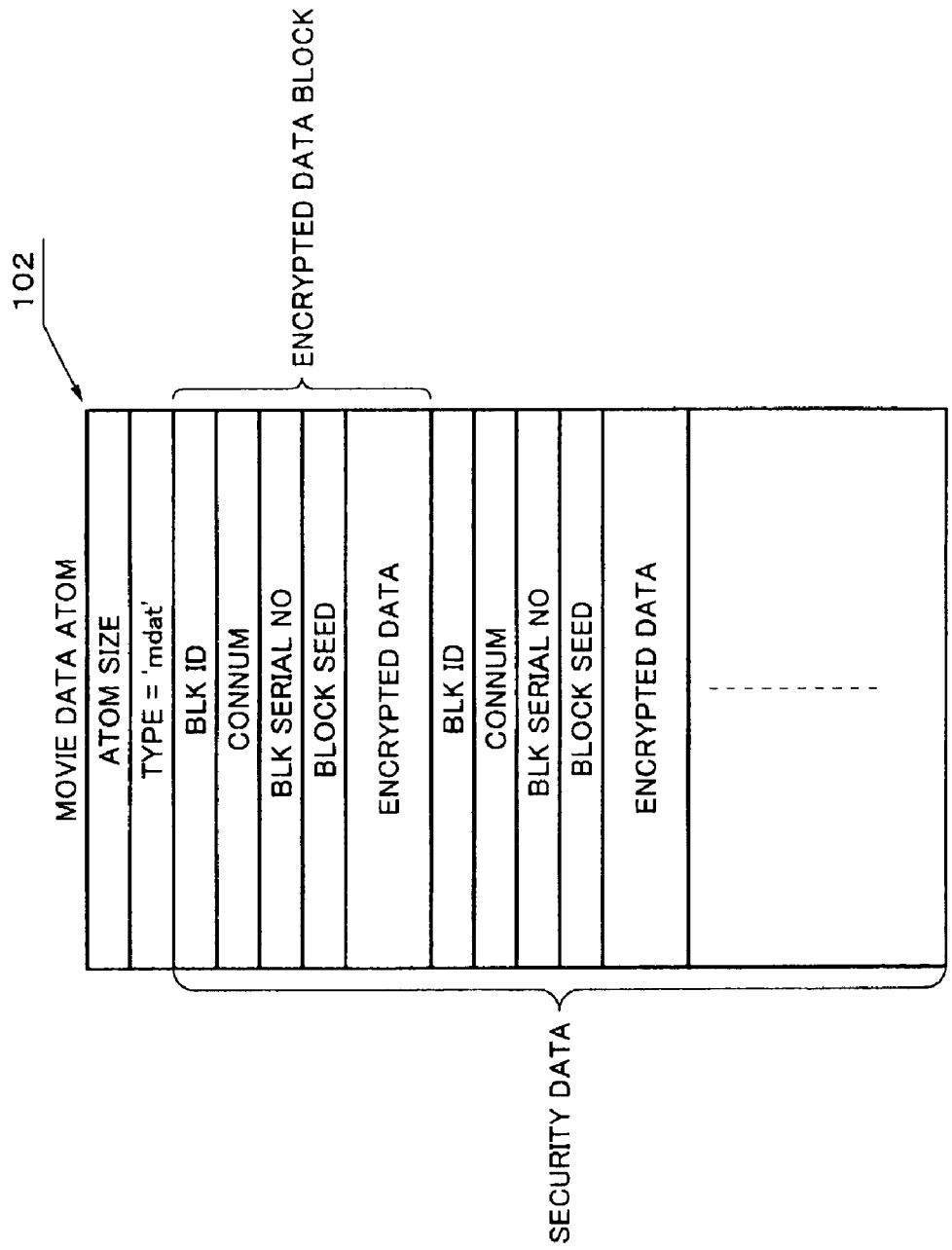
FIG. 7 is a schematic diagram showing the structure of a movie data atom.

FIG. 7 is a schematic diagram showing the structure of a movie data atom.

Figure 8:
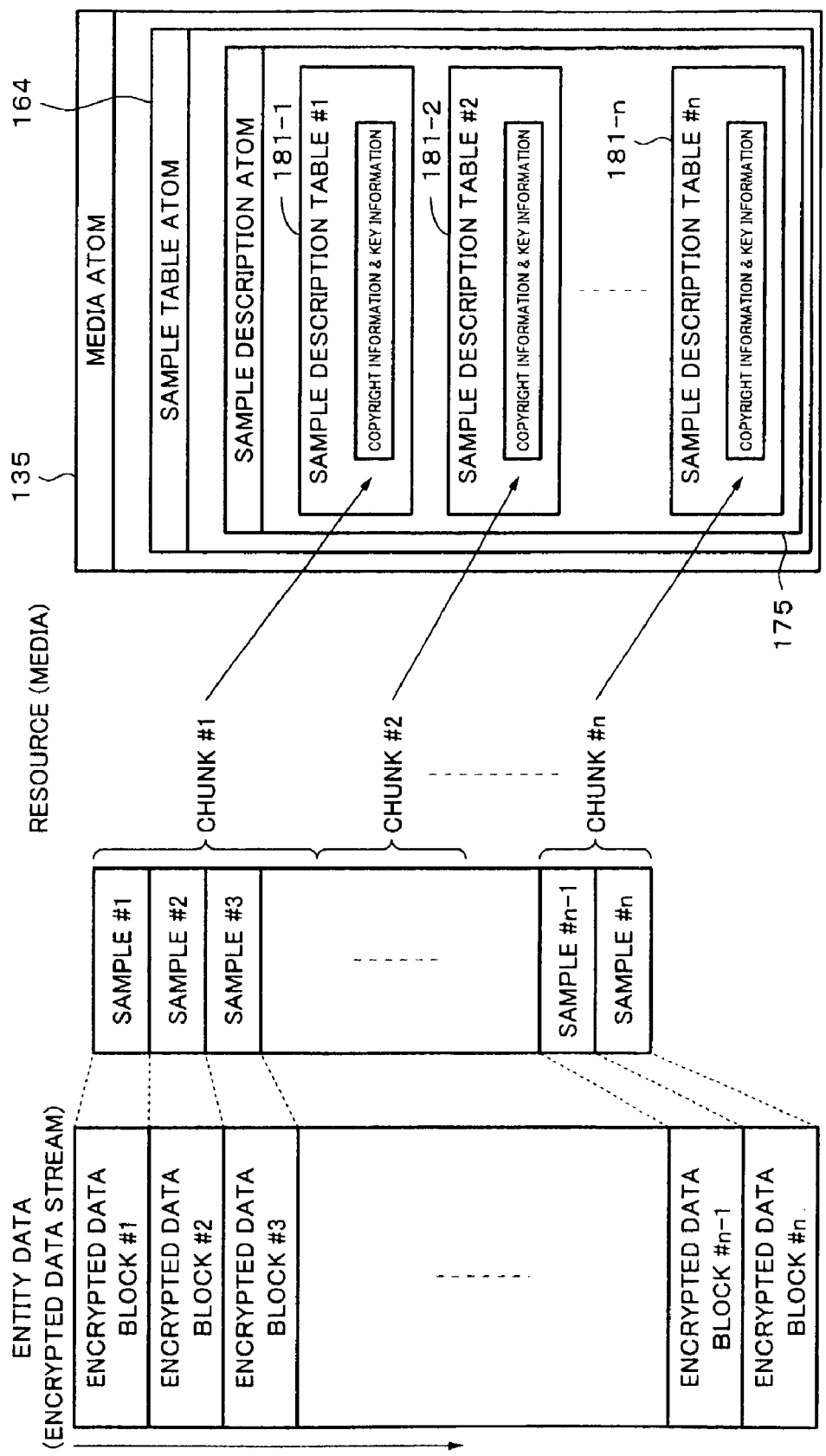
FIG. 8 is a schematic diagram showing the relation between entity data and a media atom.

FIG. 8 is a schematic diagram showing a correlation of entity data and a media atom.

In FIG. 7, movie data is an atom composed of an atom size, a type, and data. In FIG. 7, the data, portion preceded by the size and type is entity data (data stream) of the content.

Secured content data shown in FIG. 7 is encrypted corresponding to a DES (Data Encryption Standard) block encrypting algorithm that is a United States standard encrypting system. Corresponding to the block encrypting algorithm, data is encrypted in the unit of a block and an encryption key is changed at intervals of a predetermined time period. A block of encrypted data that has been encrypted with the same key and to which information necessary for decrypting the encrypted data has been added as header information is referred to as encrypted data block. In other words, an encrypted data block is a minimum decrypting unit of which it can be decrypted with a key. An encrypted data stream (composed of encrypted data block #1 to encrypted data block #n) is a sequence of encrypted data blocks.

Hereinafter, unless otherwise specified, a block represents an encrypted data block. An encrypted data block is composed of BLK ID, CONNUM, BLK serial No., block seed, and encrypted data.

The BLK ID field represents a code that identifies the beginning of the block.

The CONNUM field is an identifier ID that uniquely identifies the content. The value of the CONNUM field of each block of the content does not change. Even if the content is edited, the value of the CONNUM field does not change. The value of the CONNUM field of each block is information that represents a content that each block composes.

The BLK serial No. field represents a block number of the block. The BLK serial No. of the first block of the content is 0. The BLK serial No. of the next block is 1. In such a manner, the BLK serial No. is assigned.

The block seed field is a kind of key with which the block is encrypted. The value of the block seed field varies for each block. Generally, so that one content has only one encryption key, a key with which data is encrypted is a combination of a content encryption key and a block seed. Thus, although one content has only one encryption key, the encryption key of one content varies at intervals of a predetermined time period. The combination of the content encryption key and the block seed and the intervals at which the encryption key is varied depend on the encrypting algorithm and system.

The encrypted data field contains entity of encrypted data. One block is equivalent to a unit of a data stream such as one frame of a moving picture or one to several sound frames of audio data.

In FIG. 8, a sample that is the minimum access unit on QT is correlated with one encrypted data block. Thus, when an encrypted data block corresponds to one frame of a moving picture, QT can access and reproduce data in the unit of one frame and synchronize with another track in the accuracy of one frame. Consequently, editing operations such as a dividing operation, a joining operation, and a substituting operation can be assured in the accuracy of one frame. In the structure of the forgoing sample description table, use conditions and copyright information such as a content encryption key can be designated for each sample or every two or more samples.

Data is protected in three stages of data encryption, data falsification protection, and encryption key management. Through more stages, data can be more securely protected. According to the forgoing embodiment, data encryption is performed using DES and data falsification is performed using C_MAC. Thus, to securely protect data, it is preferred to use the management of the encryption key in the forgoing embodiment. Next, an embodiment using a method for managing an encryption key will be described.

Figure 9:
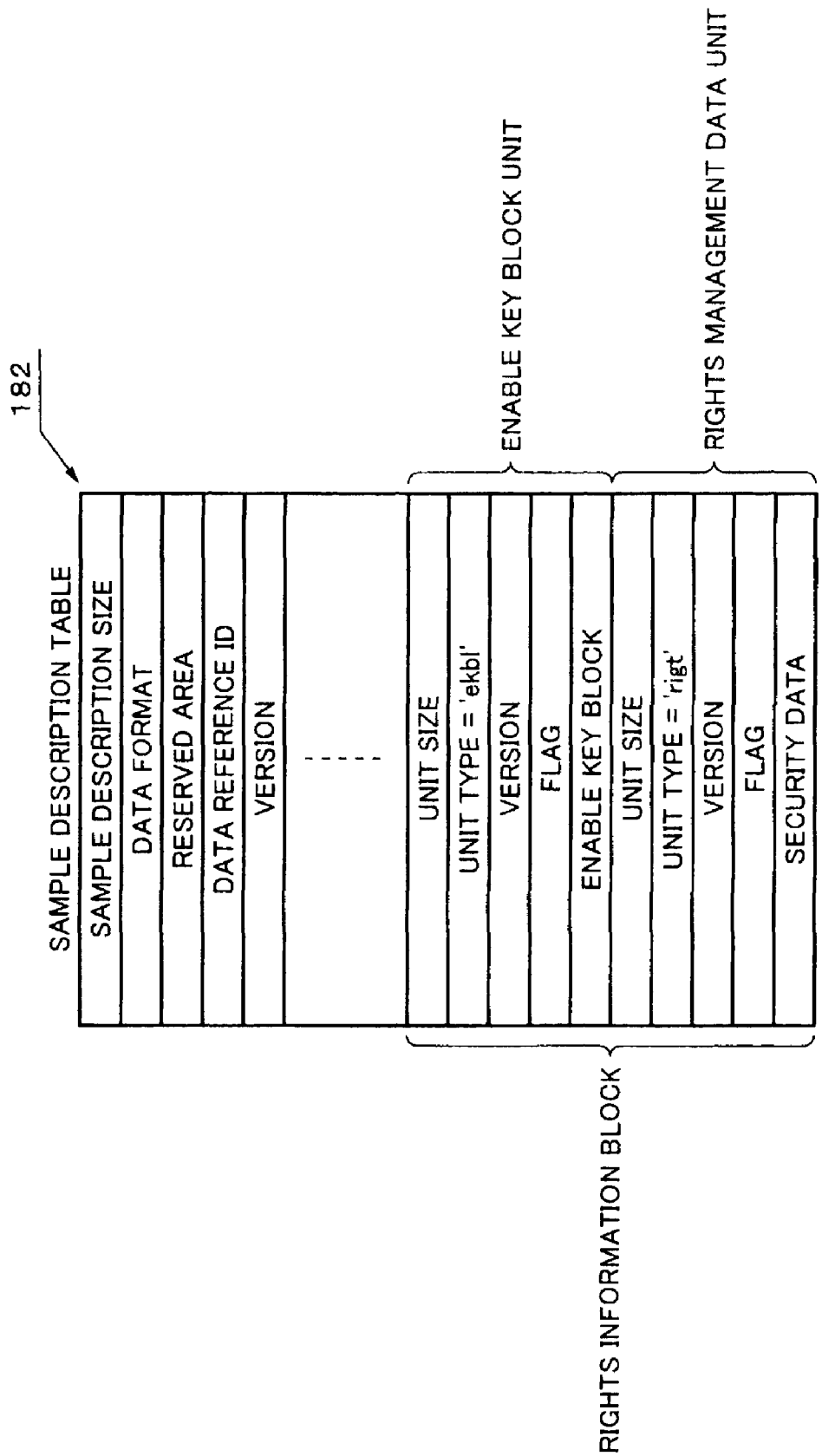
FIG. 9 is a schematic diagram showing the structure of a sample description table in the case that an encryption key is managed.

FIG. 9 is a schematic diagram showing the structure of a sample description table in the case that an encryption key is managed.

In FIG. 9, the sample description table contains standard QT fields and an extension security information block preceded thereby. The extension security information block contains an enable key block (hereinafter abbreviated as "EKB") unit and an RMD unit. The EKB unit contains at least one key necessary for obtaining an encryption key for a content named EKB, associated attribute information, and so forth.

In the EKB unit, a unit size field represents the total number of bytes of the EKB unit. In the EKB unit, a unit type field is a tag that designates the type of the unit. In this example, the unit type is ekbl. In the EKB unit, a version field represents the version of the unit. In the EKB unit, a flag field designates the presence/absence of data entity (EKB) of the unit and a referencing method therefor.

In the EKB field, an EKB field represents entity of EKB data, file ID, file name, link information such as URL, or absence of data (absence of EKB field) with a state value of a flag. EKB is basically paired with a data stream. In this case, it is not always necessary to contain entity of EKB in a movie atom (resource). For example, the entity of EKB may be stored as an independent file on the same record medium. When necessary, the entity of EKB may be referenced with link information. When EKB is redundant in the case that a plurality of contents use the same EKB, with the entity of EKB that is an independent file, the use efficiency of the capacity of the record medium can be improved. In addition, if the content provider desires, only a data stream as a content not paired with EKB can be distributed. As a result, a service of which only a data stream is distributed and EKB is obtained by designating an EKB providing site with an URL of the Internet can be accomplished.

FIG. 10 is a schematic diagram showing the definition of a flag of the EKB unit.

In FIG. 10, flag value 0X00 represents that EKB data is not present and is not valid. Flag value 0X01 represents that EKB data is present and stored in the EKB unit. Flag value 0X02 represents that although EKB data is not present in the EKB unit, the EKB data is present as an independent file on the same record medium and can be referenced with reference information such as a file ID or a file name. Flag value 0X03 represents that although EKB data is not present in the EKB unit, the EKB data can be obtained with URL information that designates a proper site on the Internet. The other flag values have been reserved.

Figure 11:
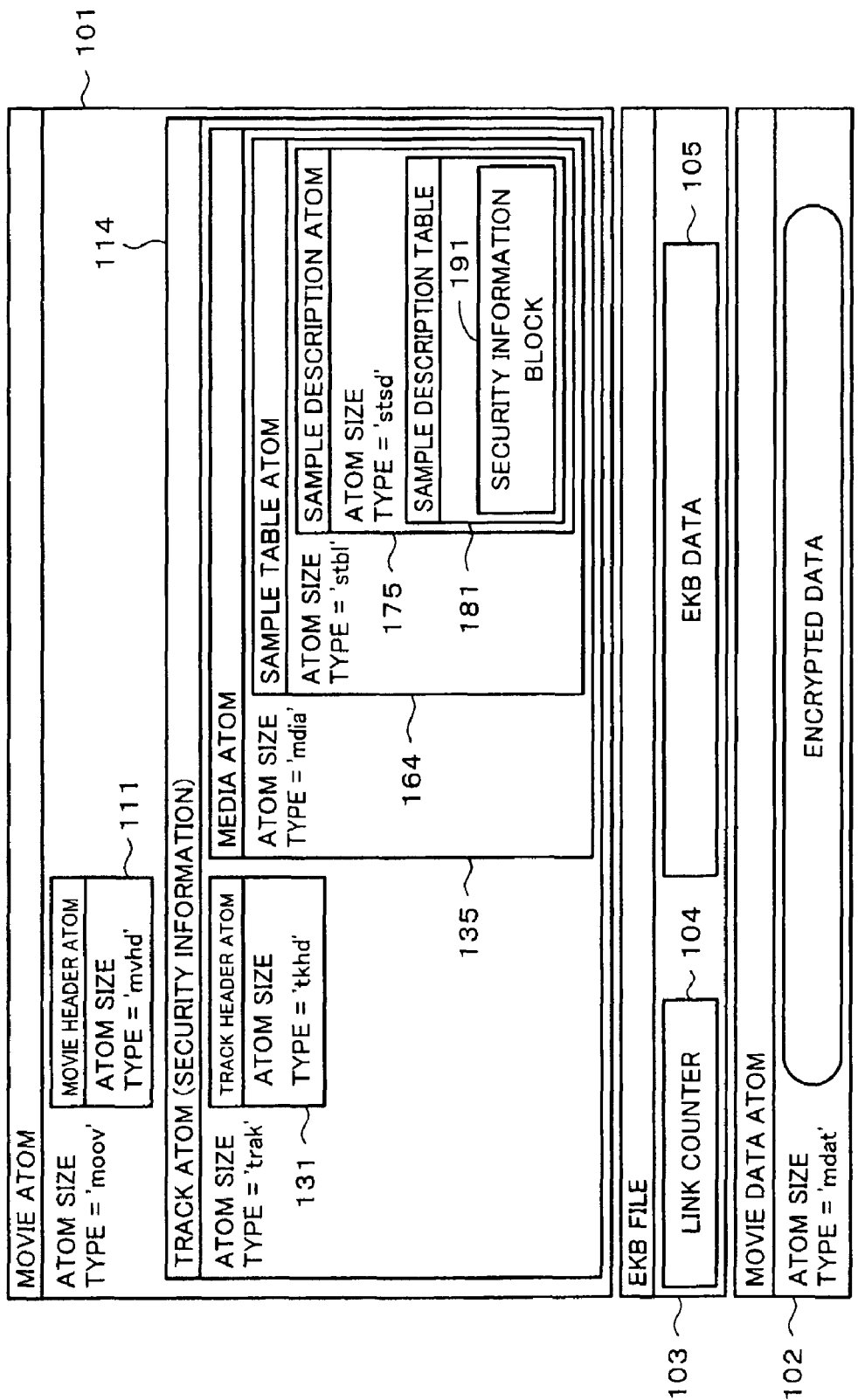
FIG. 11 is a schematic diagram for explaining the case that a security information block is an independent file.

When EKB is externally referenced, as shown in FIG. 11, the EKB is structured as an independent file. Information such as a link counter that represents movies that are linked, version, and size is added along with the entity of EKB. In such a manner, a correlation of each content (track) and EKB is managed.

In addition to such an extension, when necessary, the tag as the value of the data format field that designates the data type of the table is newly extensively defined in the standard QT fields shown in FIG. 9.

FIG. 12 is a schematic diagram showing the data structure of an EKB.

FIG. 12 shows an example of an entity of an EKB that is stored in the case the forgoing flag field designates that an EKB is present and an entity is contained in the unit.

In FIG. 12, a version field represents a version value of the EKB. An encryption algorithm field designates an encrypting algorithm with which various types of encryption key information that composes the EKB has been encrypted. When A is encrypted with key n, if the result is denoted by En (A), Ekroot (KEK) is a key encryption key that has been encrypted with key Kroot. KEK is a key necessary for obtaining an encryption key (KC) necessary for decrypting a data stream. In other words, normally, the relation CK=EKEK (encryption key of content (KC)) is satisfied.

A signature part is an electronic signature for the EKB. The signature part is followed by a sequence of key information of which the second lowest hierarchical key is encrypted with the lowest hierarchical key, the third lowest hierarchical key is encrypted with the second lowest hierarchical key, and so forth. The lowest hierarchical key is referred to as leaf key (denoted by for example Kleaf) that a medium or a device uniquely has. Thus, a valid medium or a valid device can retrieve the KEK with the EKB.

Next, the case that such a file is reproduced by a corresponding application Qt will be described.

When a movie is displayed, the system controlling microcomputer 19 accesses media data corresponding to a designated time through the file decoder 16. The system controlling microcomputer 19 designates the position of the data stream corresponding to the requested sample with information of the sample table atom. Likewise, the system controlling microcomputer 19 references the sample description table for interpreting the sample and determines the attribute of the EKB data with the flag field of the extended EKB unit. When the EKB data is present and the entity is stored, the system controlling microcomputer 19 references the next EKB field as EKB data. When the EKB data is present as an independent file, the system controlling microcomputer 19 designates the relevant EKB file with link information contained in the EKB field. When the EKB field represents a URL, the system controlling microcomputer 19 references a HP (Home Page) designated by the URL and downloads required EKB data therefrom. On the other hand, when a use permission has not been given to the content (for example, the EKB is not present), the system controlling microcomputer 19 performs a required process (for example, issues a message representing that the content cannot be reproduced or a message representing that the EKB should be obtained). With the obtained EKB and a leaf key that the application uniquely has, the system controlling microcomputer 19 can obtain the KEK for obtaining the encryption key for the content. With the KEK and RMD, the system controlling microcomputer 19 obtains an encryption key for decrypting the content. In addition, the system controlling microcomputer 19 determines information of various use conditions. The system controlling microcomputer 19 performs a process corresponding to the use conditions. With the obtained content encryption key and block seed contained in the encrypted data block, the system controlling microcomputer 19 causes the file decoder 16 to decode the block. The system controlling microcomputer 19 causes a corresponding codec to expand the decoded data stream and the video decoder to display the resultant data.

Next, the relations between rights protecting methods and provided services will be described.

Figure 13:
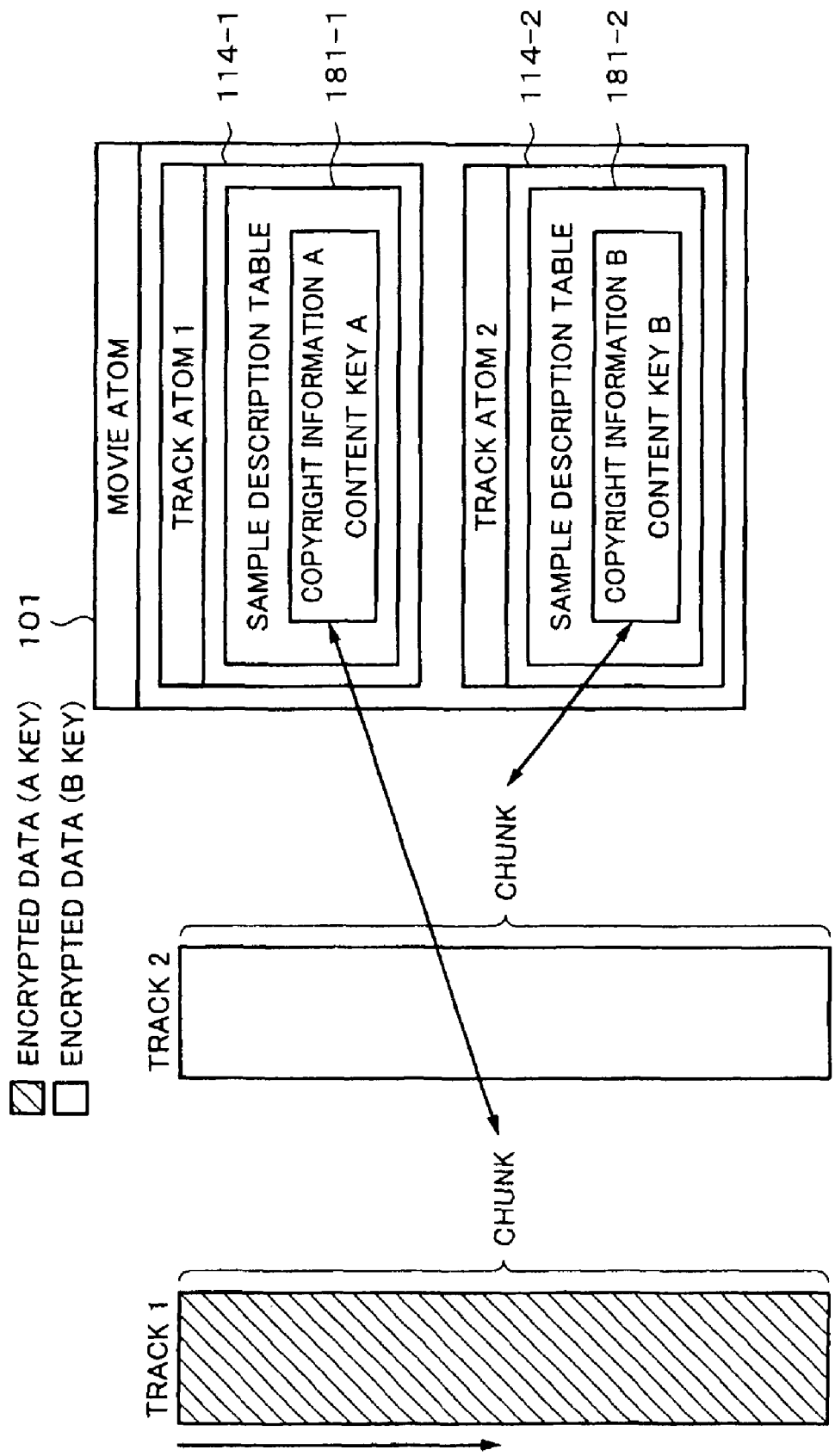
FIG. 13 is a schematic diagram for explaining a first relation between a rights protecting method and a provided service.

FIG. 13 is a schematic diagram for explaining a first relation between a rights protecting method and a provided service.

In FIG. 13, a plurality of tracks are provided. Contents that are the same but different in quality (resolution, sound quality, etc.) are recorded on the tracks. Different copyright information is added to the sample description table of each track. Different fees are designated to the respective tracks. Copyright protection information and a content encryption key corresponding to the paid fee are provided to the user. As a result, a content having a quality corresponding to the paid fee can be provided.

For example, track 1 contains a content having a first resolution. Copyright information A and content encryption key A corresponding to the content having the first resolution are contained in the sample description table. Track 2 contains a content having a higher resolution than the first resolution. Copyright information B and content encryption key B corresponding to the content having the higher resolution are contained in the sample description table. In this case, when an initial fee has been paid, one of the EKB of the copyright information A and the content encryption key A that has not been provided to the user or both of them are provided to the user so that he or she can reproduce the track 1. When the user has paid a special fee along with the initial fee, one of the EKB of the copy right information B and the content encryption key B that has not been provided to the user or both of them are provided to the user so that he or she can reproduce the track 2.

Alternatively, different fees are designated. Corresponding to the paid fee, one of the EKB of the copyright information A and the content encryption key A that has not been provided to the user or both of them are provided to the user. Alternatively, corresponding to the paid fee, one of the EKB of the copyright information B and the content encryption key B that has not been provided to the user or both of them are provided to the user. Thus, a content having a resolution corresponding to the paid fee can be provided. In such a manner, contents having a scalability corresponding to paid fees can be provided.

Moreover, likewise, when different contents for example video contents and music contents are recorded on tracks, if the user pays an additional fee for a song the he or she bought through a music distributing service, he or she can obtain a video content or a Karaoke content as examples of various services.

Figure 14:
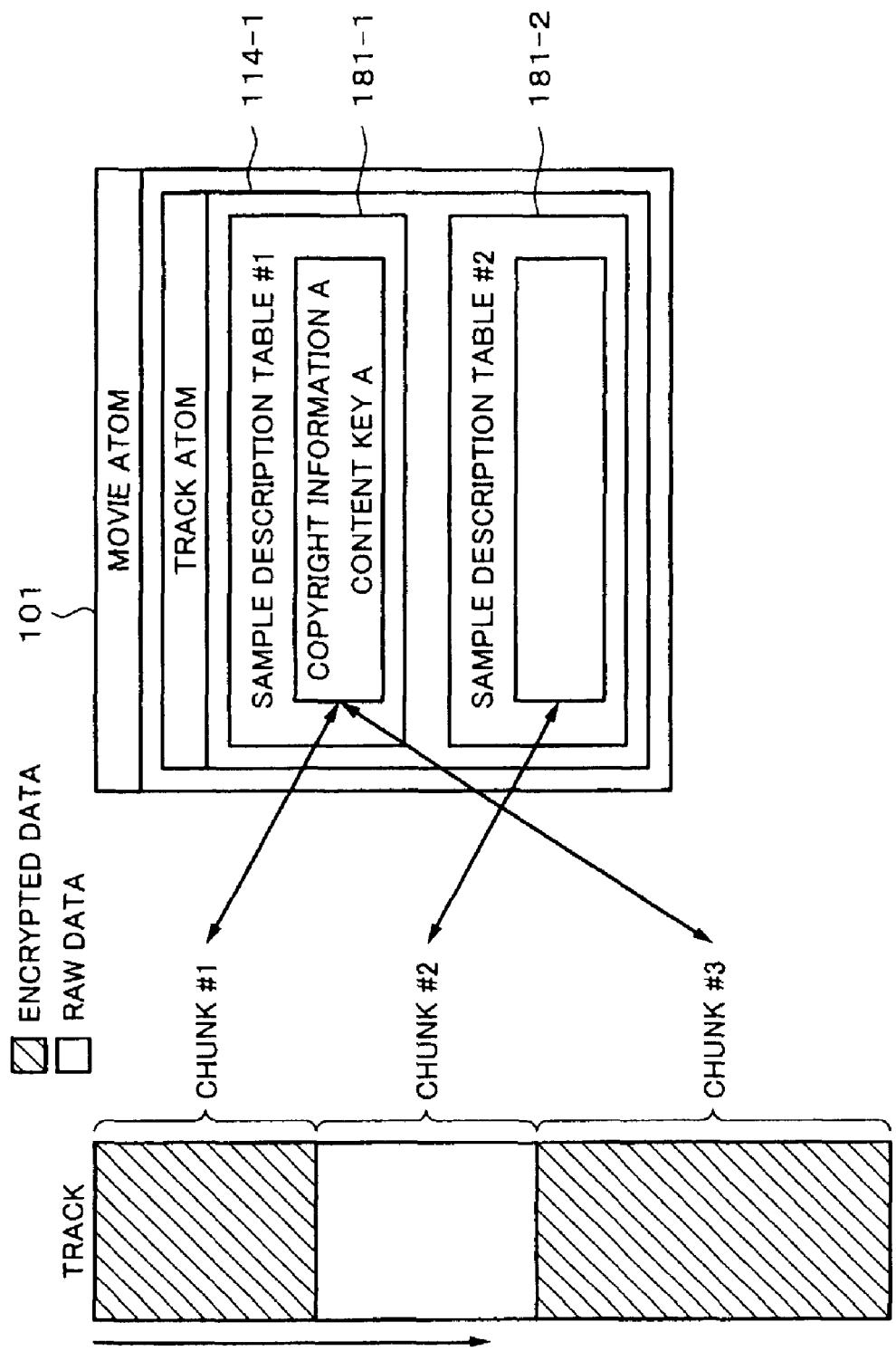
FIG. 14 is a schematic diagram for explaining a second relation between a right protecting method and a provided service.

FIG. 14 is a schematic diagram for explaining a second relation between a rights protecting method and a provided service.

In FIG. 14, one track is composed of an encrypted block and a non-encrypted block. A sample description table for the encrypted block contains copyright information thereof.

As a result, the following music distributing service can be accomplished. In other words, a particular portion of a song (for example, a featured portion) designated by the content provider is structured as a non-encrypted portion. Consequently, the use can listen to a demonstration of a part of the song without paying a feed. When the user wants to buy the song, he or she buys a content key (namely, EKB data necessary for obtaining the content key). When the user buys the content key, he or she can fully enjoy listening to the song.

FIG. 15 is a schematic diagram for explaining a third relation between a rights protecting method and a provided service.

In FIG. 15, one track is divided into several blocks that have been encrypted with different content encryption keys. Sample description tables of the individual blocks contain respective copyright information.

As a result, the following moving picture distributing service can be accomplished. A sequence of one content is sold by pieces divided in a manner that the copyright owner desires. When use conditions such as playback validation period are changed with the same key, a content such as a strip of dramas can be published the reproduction of the content can be permitted) at timings the copyright owner desires.

In a combination of the forgoing conditions, since complicated use conditions can be designated to one content, more specific and original content services can be provided than before.

Conventionally, a content and a key therefor are jointly handled. Thus, only a content that the user desires is provided thereto.

However, according to the present invention, a content, an EKB for copyright information necessary for using the content, and a content encryption key are separately managed. Thus, when a content is distributed to the user, a record medium on which a plurality of contents have been recorded can be delivered to the user in advance. Alternatively, a plurality of contents can be distributed to the user in advance. In other words, contents that the user has not desired can be provided to him or her.

Thus, when the provider provides only one of the EKB of the copyright information and the encryption key of the content that the user desires or both of them to the user, he or she can use the desired content.

Thus, only the minimum data such as the EKB of copyright information and the content encryption key can be provided to the user. When the minimum data is provided through a communication line, the communication time can become much shorter than the conventional method for providing both the content and the encryption key to the user. As a result, the user can smoothly download a content at low cost without suffering from stress.

A record medium on which a file according to the present invention has been recorded can be read by a computer that has installed QT. If an encryption key necessary for decrypting a content has not been recorded on a record medium, when a computer has a communication interface such as a modem that can be connected to a communication line, the encryption key can be obtained through the communication line. Thus, entity data and rights necessary for using the content data can be separately sold.

According to the present invention, intangible property rights entitled to entity data whose data structure has been converted into a file structure that can be handled by software can be securely protected.

In addition, according to the present invention, the rights protection unit is matched with a first data unit that composes a content. Thus, the user can access, reproduce, synchronize, and edit data in the unit that the data provider desires.

DESCRIPTION OF REFERENCE NUMERALS

11 VIDEO ENCODER
12 AUDIO ENCODER
13 VIDEO DECODER
14 AUDIO DECODER
15 FILE GENERATOR
16 FILE DECODER
17, 20 MEMORY
18 MEMORY CONTROLLER
19 SYSTEM CONTROLLING MICROCOMPUTER
21 ERROR CORRECTION CODE ENCODER/DECODER
23 DATA MODULATOR/DEMODULATOR
24 MAGNETIC FIELD MODULATION DRIVER
26 OPERATING PORTION
30 SERVO CIRCUIT
31 MOTOR
32 MAGNETIC FIELD HEAD
33 OPTICAL PICKUP
40 RECORD MEDIUM
103 EKB FLE
104 LINK COUNTER
105 EKB DATA
175 SAMPLE DESCRIPTION ATOM
181, 182 SAMPLE DESCRIPTION TABLE
191 SECURITY INFORMATION BLOCK

The invention claimed is:

1. A recording apparatus that records encrypted data to a rewritable record medium, comprising:
    converting means for converting a data structure of the encrypted data into a predetermined file structure that can be handled by software; and
    recording means for recording data that has been converted into the file structure to the record medium,
    wherein the file structure has contents data and management information data for managing the contents data, the contents data comprises a plurality of encrypted data blocks, the encrypted data block corresponds with a minimum decrypting unit of which the encrypted data block can be decrypted, a data chunk comprising one or more encrypted data blocks, and the management information data manages the contents data by the data chunk, and
    wherein the management information data contains security information for protecting an intangible property right entitled to the data chunk.

2. The recording apparatus as set forth in claim 1, wherein the security information is contained in a different file from a file which contains the contents data, and wherein the management information data contains designation information that designates the file that contains the security information.

3. The recording apparatus as set forth in claim 1, wherein the minimum decrypting unit comprises a data unit that is encrypted by a same key, and wherein the security information comprises the key.

4. The recording apparatus as set forth in claim 3, wherein the key is encrypted corresponding to a predetermined encrypting method, and wherein the management information data further contains a key necessary for decrypting the encrypted key.

5. The recording apparatus as set forth in claim 3, wherein the key is encrypted corresponding to a predetermined method, and wherein the recording means further records a file that contains a key for decrypting an encrypted key to the record medium.

6. The recording apparatus as set forth in claim 1, wherein the security information contains at least one of a start time at which the use of the contents data is started and an end time at which the use of the contents data is stopped.

7. The recording apparatus as set forth in claim 1, wherein the security information comprises number-of-times restriction information for restricting the number of times that the contents data can be reproduced.

8. The recording apparatus as set forth in claim 1, wherein the security information comprises copy restriction information for restricting the number of times that the contents data can be copied.

9. The recording apparatus as set forth in claim 1, wherein the security information comprises copy identification information for identifying whether the contents data is original contents data or copied contents data.

10. The recording apparatus as set forth in claim 1, wherein the data portion further contains falsification identification information for identifying whether or not the security information has been falsified.

11. The recording apparatus of claim 1, further comprising reproducing means for reproducing data recorded on the record medium, wherein the encrypted data blocks is a minimum data unit that can be reproduced by the reproducing means.

12. The recording apparatus of claim 1, wherein the predetermined file structure is a hierarchical file structure, and
wherein the management information contains both an information for decoding the contents data and the security information of the data chunk in a same hierarchy.

13. The recording apparatus of claim 1, wherein the file structure contains the contents data and the corresponding management data in a same file.

14. A recording method for recording encrypted data to a rewritable record medium, comprising the steps of:
converting a data structure of the encrypted data into a predetermined file structure that can be handled by software; and
recording data that has been converted into the file structure to the record medium,
wherein the file structure has contents data and management information data for managing the contents data, the contents data comprising a plurality of encrypted data blocks, the encrypted data block corresponds with a minimum decrypting unit of which the encrypted data block can be decrypted, a data chunk comprising one or more of encrypted data blocks, and the management information data manages the contents data by the data chunk, and
wherein the management information data contains security information for protecting an intangible property right entitled to the data chunk.

15. A record medium on which entity data is recorded that has been converted into a file structure that can be handled by software,
wherein the file structure has contents data and management information data for managing the contents data, the contents data comprising a plurality of encrypted data blocks, the encrypted data block corresponds with a minimum decrypting unit of which the encrypted data blocks can be decrypted, a data chunk comprising one or more encrypted data blocks, and the management information data manages the contents data by the data chunk, and
wherein the management information data contains security information for protecting an intangible property right entitled to the data chunk.

16. The record medium as set forth in claim 15, wherein the security information is contained in a different file from a file which contains the contents data, and wherein the management information data contains designation information that designates the file that contains the security information.

17. The record medium as set forth in claim 15, wherein the minimum decrypting unit comprises a data unit that is encrypted by a same key, and wherein the security information comprises the key.

18. The record medium as set forth in claim 17, wherein the key is encrypted corresponding to a predetermined encrypting method, and wherein the management information further contains a key necessary for decrypting the encrypted key.

19. The record medium as set forth in claim 17, wherein the key is encrypted corresponding to a predetermined encrypting method, and wherein a file that contains a key for decrypting an encrypted key is recorded.

20. The record medium as set forth in claim 15, wherein the security information contains at least one of a start time at which the use of the contents data is started and an end time at which the use of the contents data is stopped.

21. The record medium as set forth in claim 15, wherein the security information comprises number-of-times restriction information for restricting the number of times that the contents data can be reproduced.

22. The record medium as set forth in claim 15, wherein the security information comprises copy restriction information for restricting the number of times that the contents data can be copied.

23. The record medium as set forth in claim 15, wherein the security information comprises copy identification information for identifying whether the contents data is original contents data or copied contents data.

24. The record medium as set forth in claim 15, wherein the data portion further contains falsification identification information for identifying whether or not the security information has been falsified.

25. A recording medium having a program recorded thereon that when executed on a computer causes the computer to perform a method that records encrypted data to a rewritable record medium, the method comprising the steps of:
converting means for converting a data structure of the encrypted data into a predetermined file structure that can be handled by software; and
recording means for recording encrypted data that has been converted into the file structure to the record medium,
wherein the file structure has contents data and management information data for managing the contents data, the contents data comprises a plurality of encrypted data blocks, the encrypted data block corresponds with a minimum decrypting unit of which the encrypted data block can be decrypted, a data chunk comprising one or more of first data units encrypted data blocks, and the management information data manages the contents data by the data chunk, and
wherein the management information data contains security information for protecting an intangible property right entitled to the data chunk.

26. A recording apparatus that records encrypted video data to a rewritable record medium, comprising:
converting means for converting a data structure of individual encrypted video data that composes a moving picture into a predetermined file structure that can be handled by software for reproducing a moving picture; and
recording means for recording encrypted data that has been converted into the file structure to the record medium,
wherein the file structure has contents data and management information data for managing the contents data, the contents data comprises a plurality of encrypted data blocks, the encrypted data block corresponds with a minimum decrypting unit of which encrypted data block can be decrypted, a data chunk comprising one or more encrypted data blocks, and the management information data manages the contents data by the data chunk, and
wherein the management information data contains security information for protecting an intangible property right entitled to the data chunk.

* * * * *